US008301995B2

(12) United States Patent
Pozniansky et al.

(10) Patent No.: US 8,301,995 B2
(45) Date of Patent: Oct. 30, 2012

(54) LABELING AND SORTING ITEMS OF DIGITAL DATA BY USE OF ATTACHED ANNOTATIONS

(75) Inventors: Eli Pozniansky, Santa Clara, CA (US); Shimon Pertsel, Sunnyvale, CA (US)

(73) Assignee: CSR Technology Inc., Sunnyvale, CA (US)

( * ) Notice: Subject to any disclaimer, the term of this patent is extended or adjusted under 35 U.S.C. 154(b) by 1391 days.

(21) Appl. No.: 11/425,943

(22) Filed: Jun. 22, 2006

(65) Prior Publication Data

US 2007/0297786 A1 Dec. 27, 2007

(51) Int. Cl.
*G06F 17/00* (2006.01)

(52) U.S. Cl. ...................................... 715/230

(58) Field of Classification Search .......... 715/230–231; 348/231.4–231.5
See application file for complete search history.

(56) References Cited

U.S. PATENT DOCUMENTS

| | | | | |
|---|---|---|---|---|
| 5,633,678 A * | 5/1997 | Parulski et al. | ............ | 348/231.5 |
| 5,845,161 A * | 12/1998 | Schrock et al. | ............... | 396/313 |
| 6,038,199 A * | 3/2000 | Pawlowski et al. | ........ | 369/29.02 |
| 6,128,037 A * | 10/2000 | Anderson | ................. | 348/231.4 |
| 6,462,778 B1 * | 10/2002 | Abram et al. | ................ | 348/239 |
| 6,499,016 B1 * | 12/2002 | Anderson | ................ | 704/275 |
| 6,529,920 B1 | 3/2003 | Arons et al. | | |
| 6,590,608 B2 * | 7/2003 | Matsumoto et al. | ....... | 348/231.2 |
| 6,629,104 B1 * | 9/2003 | Parulski et al. | ............... | 382/307 |
| 6,721,001 B1 | 4/2004 | Berstis | | |
| 7,035,807 B1 * | 4/2006 | Brittain et al. | ................ | 704/278 |
| 7,053,938 B1 * | 5/2006 | Sherry | ........................ | 348/231.4 |
| 7,206,747 B1 * | 4/2007 | Morgan et al. | ................ | 704/275 |
| 2001/0012062 A1 * | 8/2001 | Anderson | ..................... | 348/222 |
| 2002/0027976 A1 * | 3/2002 | Wilcox et al. | ................ | 379/67.1 |
| 2002/0044157 A1 | 4/2002 | Wolf et al. | | |
| 2002/0099552 A1 * | 7/2002 | Rubin et al. | .................. | 704/270 |
| 2002/0129057 A1 * | 9/2002 | Spielberg | ...................... | 707/512 |
| 2002/0160751 A1 * | 10/2002 | Sun et al. | ....................... | 455/412 |
| 2003/0050982 A1 * | 3/2003 | Chang | ........................... | 709/206 |
| 2003/0113109 A1 * | 6/2003 | Pelletier | ........................ | 396/321 |

(Continued)

FOREIGN PATENT DOCUMENTS

JP 09-135417 A 5/1997

(Continued)

OTHER PUBLICATIONS

EPO/ISA, "Notification of Transmittal of the International Search Report and the Written Opinion of the International Searching Authority, or the Declaration," corresponding International Application No. PCT/ US2007/069049, mailed on May 6, 2008, 11 pages.

*Primary Examiner* — Laurie Ries
*Assistant Examiner* — Frank D Mills
(74) *Attorney, Agent, or Firm* — Perkins Coie LLP (57) ABSTRACT

Annotations are associated with individual digital pictures that represent a characteristic of the pictures, such as their content, place of taking, etc. An annotation is directly entered into a digital camera and selected for association with pictures to be taken after that. The association of the selected annotation occurs automatically within the camera until another annotation is selected. An annotation is preferably entered into the camera by the voice of the user prior to taking pictures that are characterized by the annotation. The pictures may then be conveniently sorted by subject matter through use of the annotations. The same technique may be used to annotate audio segments.

44 Claims, 5 Drawing Sheets

U.S. PATENT DOCUMENTS

| | | | |
|---|---|---|---|
| 2003/0122943 A1* | 7/2003 | Irie | 348/231.4 |
| 2003/0174218 A1* | 9/2003 | Battles et al. | 348/231.4 |
| 2003/0174893 A1* | 9/2003 | Sun et al. | 382/232 |
| 2003/0202243 A1* | 10/2003 | Boys et al. | 359/410 |
| 2004/0021780 A1* | 2/2004 | Kogan | 348/231.3 |
| 2004/0027624 A1* | 2/2004 | Parulski et al. | 358/527 |
| 2004/0123231 A1* | 6/2004 | Adams et al. | 715/500.1 |
| 2004/0172070 A1* | 9/2004 | Moore et al. | 607/5 |
| 2004/0201676 A1* | 10/2004 | Needham | 348/207.1 |
| 2004/0201685 A1* | 10/2004 | Seaman et al. | 348/207.1 |
| 2004/0201692 A1 | 10/2004 | Parulski et al. | |
| 2004/0201752 A1 | 10/2004 | Parulski et al. | |
| 2004/0205286 A1* | 10/2004 | Bryant et al. | 711/1 |
| 2004/0205482 A1* | 10/2004 | Basu et al. | 715/500.1 |
| 2004/0221227 A1* | 11/2004 | Wu | 715/512 |
| 2004/0223747 A1 | 11/2004 | Otala et al. | |
| 2004/0237032 A1* | 11/2004 | Miele et al. | 715/512 |
| 2005/0018057 A1 | 1/2005 | Bronstein et al. | |
| 2005/0041120 A1* | 2/2005 | Miller | 348/239 |
| 2005/0097451 A1* | 5/2005 | Cormack et al. | 715/512 |
| 2006/0007315 A1* | 1/2006 | Singh | 348/207.99 |
| 2006/0036441 A1* | 2/2006 | Hirota | 704/270.1 |
| 2006/0056599 A1* | 3/2006 | Cragun | 379/67.1 |
| 2006/0092291 A1* | 5/2006 | Bodie | 348/231.99 |
| 2006/0107297 A1* | 5/2006 | Toyama et al. | 725/105 |
| 2006/0173909 A1* | 8/2006 | Carlson et al. | 707/104.1 |
| 2007/0008321 A1* | 1/2007 | Gallagher et al. | 345/473 |
| 2007/0038458 A1* | 2/2007 | Park | 704/270 |
| 2007/0081796 A1* | 4/2007 | Fredlund et al. | 386/125 |
| 2007/0124292 A1* | 5/2007 | Kirshenbaum et al. | 707/3 |
| 2007/0127888 A1* | 6/2007 | Hayashi et al. | 386/96 |
| 2007/0244702 A1* | 10/2007 | Kahn et al. | 704/260 |
| 2007/0245229 A1* | 10/2007 | Siedzik et al. | 715/512 |
| 2007/0256016 A1* | 11/2007 | Bedingfield, Sr. | 715/719 |
| 2007/0266304 A1* | 11/2007 | Fletcher et al. | 715/500.1 |

FOREIGN PATENT DOCUMENTS

| | | |
|---|---|---|
| JP | 2004-180181 A | 6/2004 |

* cited by examiner

LABELING AND SORTING ITEMS OF DIGITAL DATA BY USE OF ATTACHED ANNOTATIONS

BACKGROUND AND SUMMARY

This application relates generally to the acquisition and use of items of digital data such as digital pictures, and, more specifically, to the labeling and sorting of such items.

Users of digital cameras typically acquire a large number of still images and/or sequential images of video clips that thereafter require a great deal of time to sort or classify if full use is to be made of them. Individual motion picture scenes taken by video cameras also require sorting and classification in order to be effectively used. Currently, cameras automatically add the date and time of the capture of images to their data. This allows some later sorting and organizing data of images and scenes but does not help in finding them on the basis of their content. Audio descriptions, which can be linked with images, may also be recorded in many cameras and subsequently organized, but this also does not help to locate data of images at a later time.

In order to avoid the necessity of having to look through a large number of such pictures after data of them have been acquired, the present invention makes it much easier and more effective for the user to create categories with descriptive terms in advance of taking pictures and then causes the camera or other image acquisition device to automatically associate individual pictures with labels (annotations) of the appropriate categories. The categories may be established by the user entering, directly into the camera, labels or annotations that identify some aspect of the picture or pictures that are expected to be subsequently taken. Once a particular annotation is selected by the user, all pictures subsequently taken are automatically associated with that annotation until another annotation is specified. In a specific implementation, an annotation is selected by the user by entering the annotation directly into the camera, which is then associated with all the pictures taken thereafter until another annotation is so entered into the camera.

If a user is on a trip, for example, one category may be labeled "Rome," another "Milan," and so forth. When in Rome, that label is selected by the user and all pictures taken after that designation have the "Rome" label automatically attached to them by the camera until another category is selected. When the user proceeds to Milan, that label is selected by the user and all pictures taken after that have the "Milan" label attached to them until some other annotation is chosen, and so forth. In a specific implementation, the camera responds to entry by the user of the "Rome" category by linking this description to all pictures taken by the camera until the user selects the "Milan" annotation, after which that is attached to all pictures until another annotation is selected, and so forth. Events such as birthday parties, anniversaries, graduations, and the like, may also commonly be the subject of labels that are automatically associated within the camera with pictures taken of those events. Further, the names of individuals whose pictures are to be taken may be specified in an annotation. Also, the annotation may be of a date or time that one or more pictures are expected to be taken. In general, an expected content, attribute or circumstance of taking one or more pictures can serve as their annotation. The content of the category labels is not limited but rather may be any aspect of the picture(s) that the camera user determines to be helpful for the later classification and use of pictures about to be taken.

The camera may be provided with a small keyboard for entry of the category labels by the user, or the picture display screen included with most cameras may be made touch sensitive for entry of alpha-numeric characters with the help of a hand held stylus. Generally more convenient for the user, however, is to provide the camera with a microphone and the capability to store data of an audio description entered by the user speaking it. A loud speaker may then also be included in the camera for use by the user to listen to previously recorded annotations associated with pictures being viewed on the camera's display or to edit the annotations. The audio labels are not part of any soundtrack that is acquired at the image scene simultaneously with capturing the images but rather are created and stored separately for the purpose of classifying the images. The camera may also include a processing capability to convert the speech to text that is then stored in memory along with the pictures with which the annotation is subsequently associated. Alternatively, in order to avoid the camera having to perform such intensive processing, such speech-to-text processing may be done by a processor to which the camera is temporarily connected, such as a processor that is made available on the Internet for such purposes or a personal computer (PC).

Data of the pictures and annotations linked with them are then typically loaded from the camera into some another device that utilizes the data, such as a personal computer, a laptop computer, a DVD recorder or a personal video recorder (PVR). The camera may be directly connected to a utilization device by a cable or wirelessly, or through a data network that can include the Internet, or by use of a non-volatile memory card that is physically removed from the camera and then connected with the utilization device. The utilization device then preferably processes the data to automatically place the pictures in folders that are titled with the annotations to which they are linked. For example, the pictures associated in the camera with Rome are automatically placed in a folder labeled "Rome," those with Milan in a folder named "Milan," and so forth. This provides the camera user a very convenient and largely automatic categorization of pictures that have been taken. Particularly, the naming of categories and sorting pictures into categories after the pictures are taken are then both unnecessary. This is a particular convenience for a user who takes a very large number of pictures.

The utilization device may also include a microphone for the user to enter a particular annotation to retrieve associated pictures by speech, wherein the device includes speech-to-speech processing, if the annotations are stored as audio data, or speech-to-text, if stored as text or in some coded form. Indeed, the camera may be provided with the same speech retrieval capability if its processing power is sufficient.

Additional aspects, advantages and features of the present invention are included in the following description of exemplary examples thereof, which description should be taken in conjunction with the accompanying drawings.

All patents, patent applications, articles and other publications referenced herein are hereby incorporated herein by this reference in their entirety for all purposes. To the extent of any inconsistency or conflict in the definition or use of terms between any of the incorporated publications and the present application, those of the present application shall prevail.

DETAILED DESCRIPTION OF EXEMPLARY EMBODIMENTS

Figure 1:
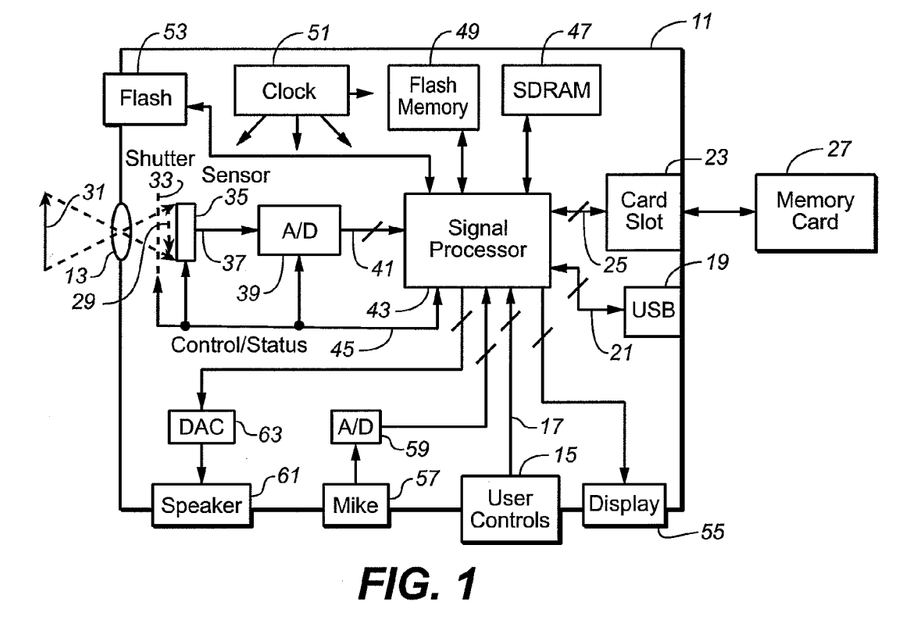
FIG. 1 is a block electronic diagram of an exemplary digital camera.
Figure 2:
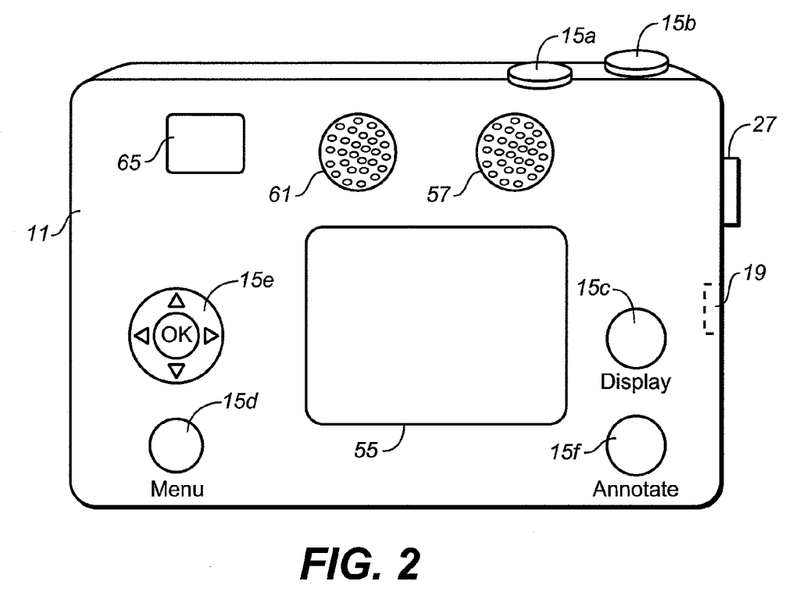
FIG. 2 is a rear view of the digital camera whose electronic block diagram is shown in FIG. 1.

Techniques of automatically annotating pictures are described herein by reference to a hand held digital camera illustrated by FIGS. 1 and 2, as representative of digital picture acquisition devices generally. Digital content acquired by the camera, including still images, motion picture segments, audio recordings and other digital data, may be annotated in the manner described herein. Motion picture scenes, still images and audio recordings acquired with a video camera may similarly be annotated. Still images, sequences of image frames, video clips and motion picture scenes are collectively referred to herein as "pictures," or more generally as "digital content," which includes audio recordings, digital data and any other acquired content. Digital picture acquisition devices in which the features described herein may be embodied include cellular telephones. Further, the techniques herein may be utilized with devices, other than picture acquisition devices, which can acquire music, speech and other sound from a networked connection, such as the Internet, or a free field audio source through a microphone. In the future, an enhanced portable media player (e.g., an enhanced iPod) may be an example of such a device where acquired audio files may be annotated in the manner described herein.

Digital Camera Example

In FIGS. 1 and 2, a digital camera is shown to include a case 11, an imaging optical system 13, user controls 15 that generate control signals 17, a digital data input-output receptacle 19 with internal electrical connections 21, and a card slot 23, with internal electrical connections 25, into which a non-volatile memory card 27 is removably inserted. Data of images captured by the camera may be stored on the memory card 27 or on an internal non-volatile memory 49, or both. Image data may also be outputted to a video device, such as a television monitor, computer, DVD recorder, and the like, through the receptacle 19 that most conveniently conforms to the format of the Universal Serial Bus (USB) specification. The memory card 27 may be a commercially available semiconductor flash memory, small removable rotating magnetic disk or other non-volatile memory to which digital data may be stored by the camera. Alternatively, particularly when the camera is taking motion image sequences at thirty image frames per second or the like, larger capacity storage media can be used instead, such as magnetic tape or a writable optical disk.

The optical system 13 can be a single lens, as shown, but will normally be a set of lenses. An image 29 of a scene 31 is formed as visible optical radiation through a shutter 33 onto a two-dimensional surface of an image sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern to generate an individual frame of digital data from which the image 29 may be reconstructed. The analog signal 37 is applied to an analog-to-digital converter circuit 39 that generates digital data in circuits 41 of the image 29.

Processing of the video data in circuits 41 and control of the camera operation are provided, in this example, by a single integrated circuit chip 43. In addition to being connected with the circuits 17, 21, 25 and 41, the circuit chip 43 is connected to control and status lines 45. The lines 45 are, in turn, connected with the shutter 33, sensor 29, analog-to-digital converter 39 and other components of the camera to provide synchronous operation of them. A separate volatile random-access memory circuit chip 47 is also connected to the processor chip 43 for temporary data storage. Also, the non-volatile memory 49 is typically a separate chip, connected to the processor chip 43 primarily for storage of the processor controlling program, calibration data and the like. A usual clock circuit 51 is provided within the camera for providing clock signals to the circuit chips and other components. Rather than a separate component, the clock circuit for the system may alternatively be included on the processor chip 43. A flash illumination source 53 is connected to, and operates in response to instructions from, the processor chip 43.

The user controls 15 (FIG. 1) include buttons 15*a*-15*f* (FIG. 2) on the outside of the camera. Button 15*a* turns power to the camera on and off, 15*b* is a shutter button, button 15*c* activates a display screen 55 to show the current field of view of the camera or a previously captured picture and depressing button 15*d* causes a menu to be displayed on the screen 55. Navigation buttons 15*e* include four quadrant buttons, used primarily to navigate the display screen to mark or highlight a desired item, which surround a central button that is used primarily to execute a function represented by the marked or highlighted item. A button 15*f* is used in a process of annotating individual pictures with some information about them in advance of the pictures being captured by the camera, in the manner described below. Other user operated buttons or other types of manually actuated controls may, of course, also be included. Further, the functions controlled by the buttons shown may instead be controlled by a fewer number of actuators connected to circuits that interpret the duration or frequency with which an individual actuator is touched, or the like, to execute different functions in response.

The camera example of FIGS. 1 and 2 includes an external microphone 57 that is connected with the processor 43 through an analog-to-digital converter 59. These allow the camera user to record picture annotations by speaking them. These annotations may be replayed through a loud speaker 61 that is connected with the processor 43 through a digital-to-analog converter 63. The analog-to-digital converters 39 and 59, and the digital-to-analog converter 63, may be included as part of the processor integrated circuit 43 but more commonly are implemented in one or more other integrated circuit chip(s). An optical viewfinder 65 is optionally included as part of the camera.

Annotation of Pictures

Figure 3:
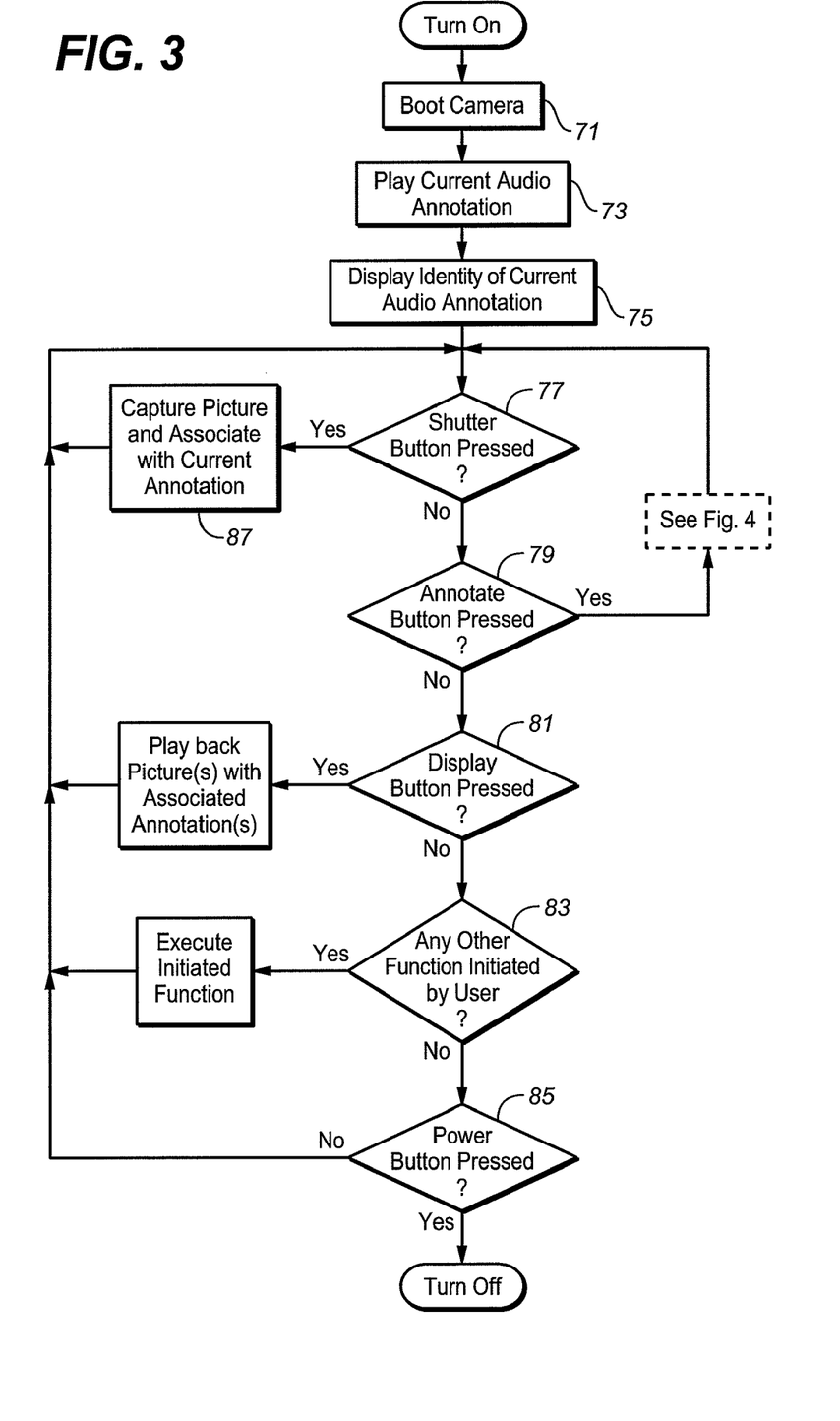
FIG. 3 is a flow chart that illustrates one operation of the camera of FIGS. 1 and 2.
Figure 4:
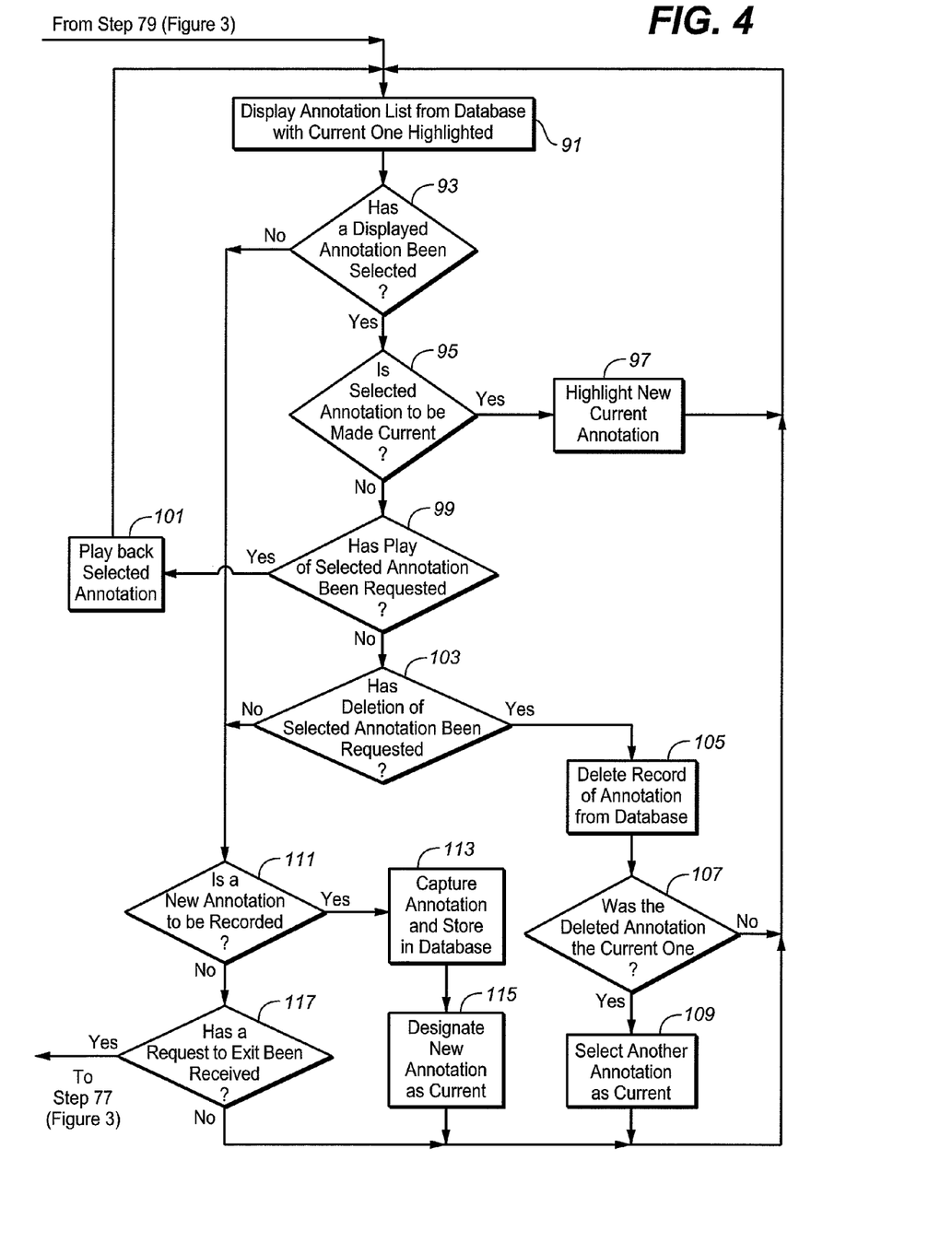
FIG. 4 is a flow chart of a processing block of the flow chart of FIG. 3.

An example operation of the camera of FIGS. 1 and 2 that utilizes audio picture annotations or labels is described with respect to the flow charts of FIGS. 3 and 4. The functions shown on these flowcharts are carried out by the signal processor 43 (FIG. 1) under control of the firmware stored in non-volatile memory 49. In response to the user activating the power on/off button 15a, the processor is initialized, in a step 71. After such initialization, in a step 73, data from a file of a currently selected annotation, if one exists, is read from non-volatile memory 49 and played back through the loud speaker 75. Although the annotation data files will typically be stored in the memory card 27 with data of the pictures to which they are linked, it is desirable for a copy of the annotation files to also be stored in the internal non-volatile memory 49. A display, in a step 75, may also be presented on the screen 55 at this time that identifies the current annotation by a number, and, optionally, an instruction such as "Press annotate button to record a new annotation."

The camera processor then scans the user control buttons in order to determine whether any have been pressed: the shutter button 15b in a step 77, the annotate button 15f in a step 79, the display button 15c in a step 81, any other functional button(s) or other actuators, including the menu button 15d, in a step 83 and the power button 15a in a step 85. If none have been pressed, operation returns from the step 85 to the step 77, and the process is repeated until one of the buttons has been pressed.

Figure 5:
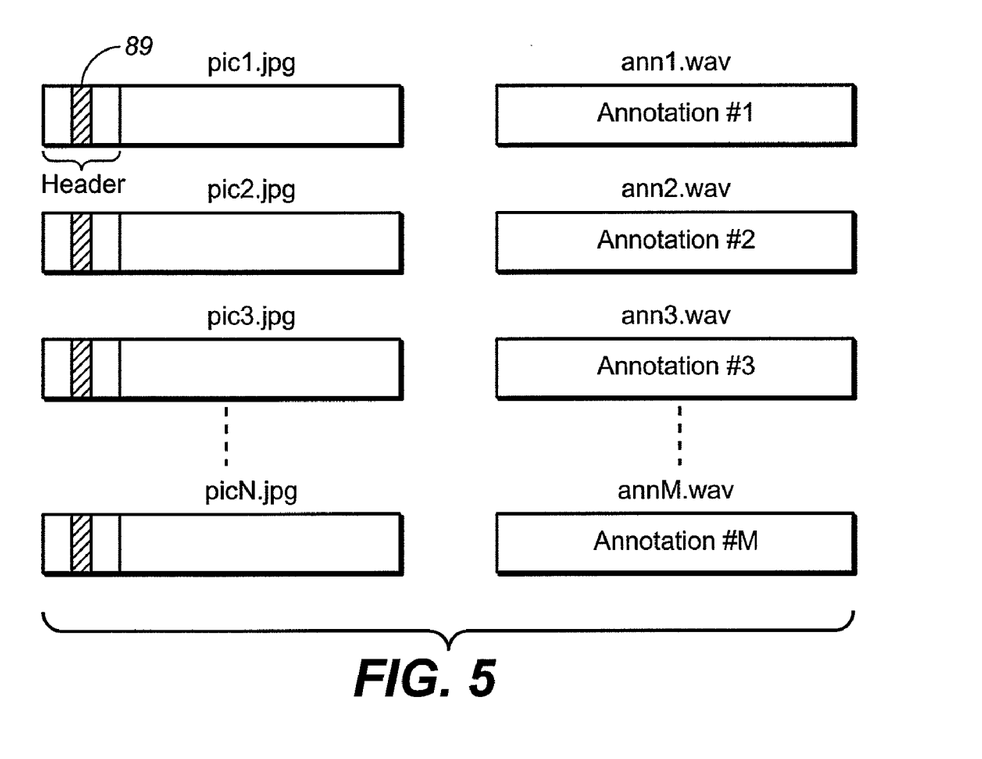
FIG. 5 illustrates a form of data that is stored by the camera of FIGS. 1 and 2 when performing the functions illustrated in FIGS. 3 and 4.

If the shutter button 15b is pressed in the step 77, the camera then proceeds to a step 87 to capture data of the picture and associate these data with the one annotation designated at that time as being current. FIG. 5 illustrates individual files of picture data, shown to be stored in a compressed jpg format, for pic1, pic2 etc. Similarly, there are multiple data files for the audio annotations, stored in this example in a wav format. One annotation is stored as ann1, the next as ann2, etc. Each picture data file may include a header, and, if so, is a convenient place to include an identification of an audio annotation file to which the picture is linked. These identifications are shown in cross-section in FIG. 5, a portion 89 of the header for the picture file pic1, for example, identifying one of the annotation files, ann1 through annM, that is associated with the picture.

The picture data files stored on a removable memory card will be accompanied by each of the audio annotation files to which the pictures are linked. If an annotation file associated with a picture being stored on a memory card is not already on that memory card, it will be written on the card at the same time as the picture data. For at least this reason, it is useful to store a copy of at least the current annotation data file in non-volatile memory within the camera. This copy is then the source of the annotation file written on the removable memory card.

As an alternative to linking picture and annotation files by references in the headers of the picture files, this can be done by recording linking references within the individual annotation files to the pictures, such as in headers of the annotation files. As another alternative, a separate table can be maintained that defines the correspondence between each of the pictures and its annotation file. The individual annotation data files may instead be included in the headers of their associated picture data files. Further, data of a picture and its associated annotation data can be combined into a single file as insurance against their link being broken, such as by including the annotation data as a "watermark" or "hidden data" within the picture data, in accordance with known techniques of adding security markings to data files.

Figure 6:
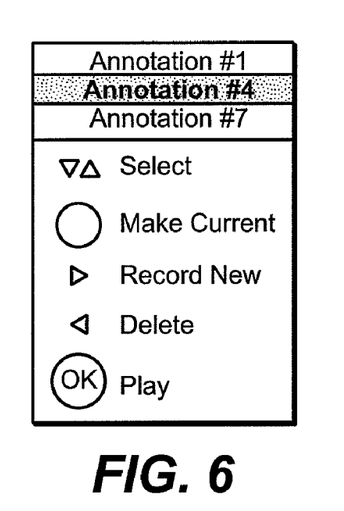
FIG. 6 shows an example display on a display screen of the camera of FIGS. 1 and 2 when performing the functions illustrated in FIGS. 3 and 4.

FIG. 4 illustrates example functions that are carried out in response to the Annotate button 15f being pressed (in step 79 of FIG. 3). In a step 91, an identification of as many of the audio annotations as convenient to fit on the display 55 (FIG. 2) are included. An example of this display is shown in FIG. 6, where three annotations are listed along with a key under them of the functions of the navigation buttons 15e to manage the annotations when in this state. The current "Annotation #4" is shown to be highlighted. This is the annotation that will be linked to any picture that is taken until a new annotation is recorded or another annotation is otherwise chosen by the camera user as the current annotation. The annotations displayed may be taken at this stage from the copies of the annotations that are kept in the non-volatile memory of the camera. The number of annotation copies stored in the camera may be limited to a preset maximum number of the most recently used annotations, in order to stay within a limited memory capacity. If the user thereafter wants to use an annotation that has been removed in this manner, it is re-entered into the camera memory.

When the display of FIG. 6 is present, the camera processor responds to actuation of the navigation buttons 15e in the manner shown in FIG. 4, according to this specific example. In addition to being able to record a new current annotation for linking to subsequent pictures, the user of the camera may change the annotation in memory that is designated as current, may delete annotations from the camera memory, or play an annotation through the camera loud speaker.

In a step 93, a camera user's selection of an annotation on the display is noted. The user makes a selection by pressing the up or down arrow navigation buttons 15e to scroll a mark, or a highlight different than that used to identify the current annotation, through the annotation list. If the user scrolls off the screen either up or down, others of the annotations stored in the camera memory will appear. The user will stop when the annotation to be selected is marked or highlighted in a unique manner. This may be the current annotation. But if another is marked, that other may be made the current annotation by the user pressing the annotate button 15f, in this example. If so, this is noted in a step 95 and the highlighting is moved (step 97) on the display 55 to the marked annotation, thereby to show that it has now been designated within the camera memory as the current annotation. All pictures taken after that will be automatically associated with the newly designated current annotation until some other annotation is selected.

In a next step 99 of FIG. 4, if the user has not changed the designation of the current annotation, the processor notes whether the user has requested to play the selected annotation. This request is made by the user pressing the center button of the navigation buttons 15e. The selected annotation is then played through the camera loud speaker, as indicated by a step 101. After it is played, in this example, the process returns to step 91, where the annotation list is again displayed.

If play of the selected annotation is not desired, the processor then determines whether the user has depressed a button to delete the annotation from the camera memory, as indicted by a step 103. In this example, this is done by pressing the left arrow of the navigation buttons 15e. In response, the data file for the selected annotation is deleted, per a step 105. This only deletes it from the non-volatile memory of the camera, and does not remove the file from the memory card 27 or any other media where it has already been associated with one or more pictures. This deletion simply means that the user will not be able to associate the annotation of the deleted file with any other pictures taken after that. If the user changes his or her mind, the deleted annotation needs to be re-entered.

Since it is preferable that one of the annotations stored in the camera memory be designated as the current annotation at all times, a next step 107 inquires whether the deleted annotation was the current one. If so, in a step 109, another is so designated. This may be automatic, such as by choosing the next in order of the stored annotations, or may prompt the user to chose one from the existing annotations or record another as the current annotation. After this is completed, the process returns to the step 91.

If neither of the up or down arrow of the navigation buttons 15e is pushed in step 93, steps 95, 99 and 103 are skipped. No stored annotation has been selected to be made current, to be played or deleted. If the user wants to record a new annotation instead, the right arrow of the navigation buttons 15e is pushed and this is recognized in a step 111. The user records a new annotation by speaking into the microphone 57 on the back of the camera (FIGS. 1 and 2), per a step 113. A limit may be placed on the duration of the annotation that may be recorded, such as a maximum length of 5 seconds. An annotation may typically be within 3 to 5 seconds in length. In a next step 115, the newly recorded annotation is designated as the current annotation. After this, the processing returns to the step 91.

Although the capability of the user to deal with previously recorded annotations is provided, as described above, the user will more typically simply record a new annotation when the pictures to be taken are expected to have a different characteristic than those previously taken. The annotation is associated with each picture after that until a new annotation is recorded and made to be the current one. For instance, when the user arrives on vacation in Rome, he or she may record an annotation of "Rome." Each picture taken after that has the "Rome" annotation automatically associated with it. After traveling from Rome to Milan, the user then records another annotation for "Milan" and all pictures after that have the "Milan" annotation automatically associated with them, until yet another annotation is recorded.

The annotation processing of FIG. 4 is exited, at a step 117, when the user takes some action that shows he or she has terminated manipulations of the annotations. The process then returns, in this example, to the step 77 (FIG. 3), and the user needs to again press the annotate button 15f if he or she wants to re-enter the annotation management process of FIG. 4. Such termination can be made to occur when some other button on the camera is actuated, for example when one of the shutter button 15b, the menu button 15d, the display button 15c is pressed or, of course, when the power button 15a is pressed. Pressing the power button 15a causes the camera to turn off.

There may be times that the user desires to re-record an annotation, in order to better characterize pictures already taken and/or others to be taken, because the initial recording is difficult to understand because of a noisy background when recorded, or the like. A capability for doing this (not shown) may also be provided by the camera's operation.

Further, a capability for the user to change the annotation automatically associated with an individual picture after its capture (not shown) may also be provided. The user may on occasion want to select another of previously recorded annotations to be associated with the picture, or to record a new annotation to be linked with the picture.

Since an annotation will typically be useful for a limited period of time, the camera may be provided with the capability of automatically alert the user when the camera is turned on after having been off for some set period of time, such as two or more days. Rather than continuing to associate the last selected annotation with pictures taken after such a period of non-use, the camera can request the user to either confirm that the last selected annotation is to be used or enter a new annotation. This will help to prevent mis-categorization of images.

Pictures may be displayed on the camera screen 55 by scrolling through the pictures by use of the navigation buttons 15e, in a typical manner. The pictures may also be limited to those in one group that have the same annotation by the user speaking a previously recorded annotation into the camera microphone 57 while the display button 15c is pressed. Indeed, the camera may be provided with the option for the user to play back all images associated with a particular annotation entered into the camera. The camera processing may include speech-to-speech recognition. The user then scrolls through the pictures having an annotation that is spoken and others are not presented. Speech-to-speech recognition may be used for many purposes in the camera, including the retrieval, re-organization or aggregation of the stored pictures based on their linked annotations.

Figure 7:
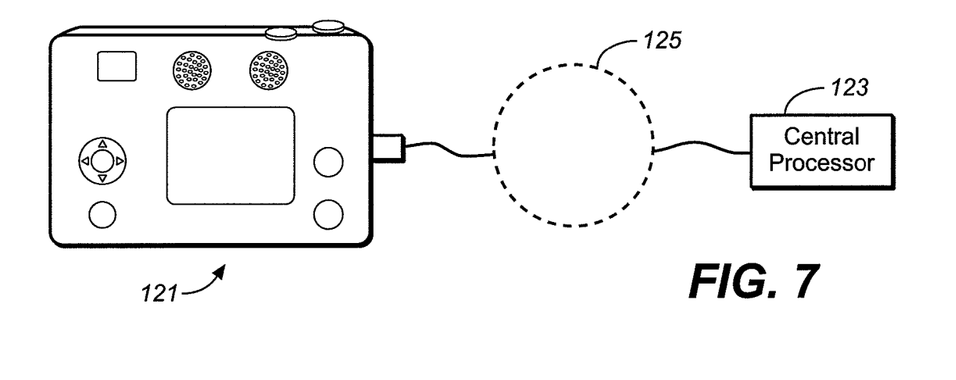
FIG. 7 illustrates connection of the camera of FIGS. 1 and 2 to a processing device.

The audio annotation has been described above to be stored as a digital data file and played back in an audio format. The camera display 55 can then only visually identify the stored annotations by number or some other indicia unrelated to the content of the annotations. An alternative approach is to convert the inputted speech to text, and then store the annotation file as text instead of audio. Pictures displayed on the camera screen 55 may then have the annotation text displayed along with them. Instead of storing the text in separate files, the text may be embedded either in the audio annotation files or in the image files to which the text pertains. The processor within the camera may make this conversion but since this can take a significant amount of processing power, it may be preferable to do the conversion outside of the camera. FIG. 7 illustrates the connection of a camera 121 through a cable connected with it's USB receptacle to a computer or other data processor 123 for this purpose. This may be a connection with the user's personal computer or over a network 125 that may include the Internet. A camera manufacturer or other entity having a business in cameras, or in data storage and retrieval, such as search engines like Google or Yahoo, may operate such a central computer for its customers to use.

In order to assure proper association of the converted text received from such a computer with the correct pictures, a hash value may be calculated from the date, time, length of the audio annotation and/or similar characteristics that exist. This hash value is then compared with one stored in connection with the one or more pictures with which the annotation is associated. A proper link of the received text annotation with its associated pictures is thus maintained.

As an alternative to use of speech, the camera may be provided with a very small keyboard or the display screen 55 may be of a type that is touch sensitive to allow entry of alpha-numeric characters by touch with a stylus or other pointed instrument. A touch sensitive screen may be enabled to accept written characters or may display a keyboard whose characters are tapped by the stylus. The user physically enters the annotation, which is stored as a text file. The microphone 57 and loud speaker 61 are then not used for picture annotation, so may be omitted from the camera unless the camera provides two or more options for entry of the annotations. Otherwise, the camera operates substantially the same as described above.

Use of the Annotated Pictures

Data of pictures taken as described above are typically downloaded from the camera into a utilization device, either directly or over a network that may include the Internet. The utilization device may be a central processor operated by others at some distant location, if the Internet is used, or be the user's own personal computer, notebook computer, DVD recorder, personal video recorder (PVR), or other such utilization device. The picture data are downloaded from the camera into such a utilization device in the same manner as is currently done but this time each picture data file is linked to an accompanying pre-selected annotation data file. Each annotation data file may be linked with multiple picture files but an individual picture file, in this example, is linked to only one annotation file.

Figure 8:
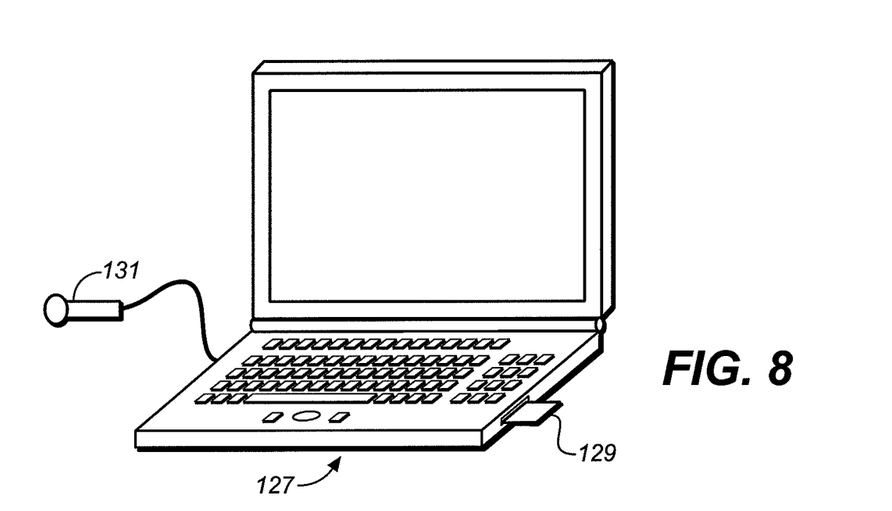
FIG. 8 shows a notebook computer as an example device that utilizes data of pictures acquired by the camera of FIGS. 1 and 2.
Figure 9:
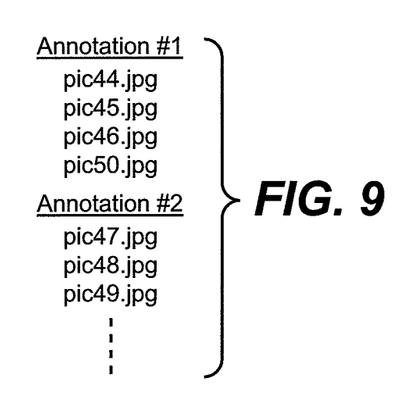
FIG. 9 illustrates an example structure of file data maintained within the utilization device of FIG. 8.

For example, a notebook computer 127 is illustrated in FIG. 8 as a utilization device that has received such files by connection of a memory card 129 that was removed from a camera. Alternatively, the camera may be connected with the utilization device by cable or a wireless link to download picture and annotation data files into the utilization device. These files may be in addition to a large number of other picture files stored over time in a mass storage memory of the computer 127. The utilization device is preferably provided with software that automatically sorts the picture files by grouping all those with a common annotation together. An example of this is shown in FIG. 9, where several picture files are listed under each of the annotations with which they are associated. The pictures associated with a given annotation may be obtained by the utilization device scanning the picture files to identify those containing a link to a particular annotation.

A particular group of pictures may be retrieved from a large database of pictures by typing into the computer 127 the annotation number, if audio annotation files are used, or the converted text of the annotation if audio has been converted to text, or if text was entered in the first place. If an audio annotation, it may be spoken into a microphone 131 connected with the computer 127 if it is provided with a speech-to-speech recognition capability. A list of the pictures associated with the annotation inputted in any of these forms is then immediately obtained, saving the time and effort of having to look at a large number of pictures in order to identify those in a desired category. Just those pictures may also be displayed in a still image slide show or sequence of motion picture scenes, depending upon the type of pictures being stored. Further, the identified pictures may be downloaded as a group onto some storage media, such as being burned on a DVD disc.

The utilization device may also be configured to identify annotations by recognizing when only a portion of the annotation has been entered, without requiring that the full annotation be entered. When using speech recognition, for example, saying "Eli" can reduce the match to all groups of pictures that have "Eli" in their annotation. By then saying "birthday," the match is further reduced to those annotations having both "Eli" and "birthday," and so on, until the match is limited to a single annotation. The group of pictures associated with that single annotation are then selected.

In order to identify an appropriate annotation associated with a group of pictures desired to be selected, the display of the utilization device 127 may simply list the annotations in a manner that the user may scroll through them, either visually and/or by replaying the audio annotation content. The user may then select one annotation on the list in order to identify the pictures to which that annotation is linked, or have those pictures directly displayed in response. Further, when the user is browsing through pictures on the utilization device or the camera, the annotation associated with each picture may also be reproduced along with each picture.

The utilization device typically includes an ability to store a new group of pictures being downloaded it its system disk drive or other non-volatile mass storage system. It may also, or instead, allow the user to store the data on a removable medium, such as an optical disk or memory card. Indeed, the automatic labeling of pictures described herein allows the user to select those of particular interest to be stored for the long term in some appropriate manner, or to be transferred to others over the Internet, for use in some other manner.

CONCLUSION

Although the various aspects of the present invention have been described with respect to exemplary embodiments thereof, it will be understood that the present invention is entitled to protection within the full scope of the appended claims.

It is claimed:

1. A method of operating a digital content acquisition device, comprising:

a user selects a first annotation stored in the acquisition device that identifies some aspect of at least a first content item to be captured, capture at least the first content item and one or more subsequently captured content items in the acquisition device, associate, within the acquisition device and without user intervention, the first annotation with the first content item, automatically associate, within the acquisition device and without user intervention, the first annotation with any other of the subsequently captured content items until a second annotation stored within the acquisition device that identifies some aspect of at least a second content item to be captured is selected by the user, capture the second content item in the acquisition device, thereafter associate, within the acquisition device and without user intervention, the second annotation with at least the second content item, store data of the captured content items along with the associated first and second annotations and record linking references of the associated annotations into headers of the captured content items;

when the acquisition device is turned on, determine whether the acquisition device had been turned off for more than a predetermined time period before the acquisition device being turned on; and if the acquisition device had been turned off for more than the predetermined time period before the acquisition device being turned on, automatically generate an alert of whether to associate a previous annotation with a next content item to be captured, wherein the previous annotation is associated with a last content item captured in the acquisition device before the acquisition device was turned off.

2. The method of claim 1, wherein the first and second content items include pictures.

3. The method of claim 1, wherein the first and second content items include audio recordings.

4. The method of claim 1, wherein the first and second content items include digital data.

5. The method of claim 1, wherein the first annotation is automatically associated with said at least the first content item and any other subsequently captured content items until the second annotation is entered into and stored within the acquisition device, after which the second annotation is automatically associated with said at least the second content item.

6. The method of claim 1, wherein the first annotation is entered into the acquisition device by user interaction with the acquisition device, in advance of capturing the at least a first content item, and the second annotation is entered into the acquisition device by user interaction with the device in advance of capturing the at least a second content item.

7. The method of claim 6, wherein the second annotation is entered into the acquisition device after capturing the at least a first content item.

8. The method of claim 1, wherein the first and second annotations are audio annotations entered into the acquisition device by a user through a microphone built into the acquisition device.

9. The method of claim 1, wherein the first and second annotations are entered into the device by the user through an alphabetic entry device built into the device.

10. The method of claim 1, wherein at least one of the first and second annotations identifies an expected content of the respective first or second content items.

11. The method of claim 1, wherein at least one of the first and second annotations identifies an expected location of capture of the respective first or second content items.

12. The method of claim 1, wherein at least one of the first and second annotations identifies an expected circumstance under which the respective first or second content items are to be captured.

13. The method of claim 1, wherein at least one of the first and second annotations identifies an event at which the respective first or second content items are to be captured.

14. The method of claim 1, wherein at least one of the first and second annotations identifies a date at which the respective first or second content items are to be captured.

15. The method of claim 1, wherein at least one of the first and second annotations identifies at least one person who is expected to be included in the respective first or second captured content items.

16. The method of claim 1, additionally comprising processing the stored data of the plurality of content items along with the associated first and second annotations in a utilization device different from the acquisition device by automatically creating first and second folders into which those of the content items associated with respective first and second annotations are automatically placed.

17. The method of claim 16, wherein the first and second annotations are audio annotations entered into the acquisition device by the user through a microphone built into the acquisition device.

18. The method of claim 17, wherein the utilization device converts the first and second audio annotations into text.

19. The method of claim 18, wherein the utilization device additionally creates labels for the first and second folders from the text.

20. The method of claim 18, wherein the utilization device additionally embeds the text within the stored data of the content items.

21. The method of claim 17, wherein content items in one of the first or second folders are retrieved from the utilization device by the user repeating either of the first or second annotations into a microphone connected with the utilization device.

22. The method of claim 8, additionally comprising:
sending the first and second audio annotations to a processing device external to the acquisition device,
converting the form of the first and second audio annotations into data of respective first and second character strings, and
storing the data of the plurality of content items along with the associated first and second character strings as representations of the respective first and second annotations.

23. The method of claim 22, wherein sending the first and second audio annotations to a processing device includes connecting the acquisition device through a communications network to the processing device, and the first and second character strings are sent back to the acquisition device from the processing device through the network.

24. The method of claim 23, wherein the network includes the Internet.

25. The method of claim 22, wherein sending the first and second audio annotations to a processing device includes use of a utilization device different from the acquisition device for sending the audio annotations through a network to the processing device, and the first and second character strings are sent back to the utilization device from the processing device through the network.

26. A method of utilizing a digital acquisition device having a built-in microphone, comprising:
recording a first memorandum in the acquisition device by speech through the microphone,
acquiring a first digital content item and a plurality of subsequently acquired digital content items in succession in the acquisition device,
associating without user intervention the recorded first memorandum with the first acquired digital content items,
thereafter automatically associating without user intervention the recorded first memorandum with one or more of the subsequently acquired digital content items,
thereafter recording a second memorandum in the acquisition device by speech through the microphone,
thereafter automatically associating the second memorandum with one or more of the subsequently acquired digital content items acquired subsequent to recording the second memorandum,
storing the data of the first digital content item and the plurality of subsequently acquired digital content items along with the associated first and second memoranda and recording linking references of the associated memoranda into headers of the digital content items;
when the acquisition device is turned on, determining whether the acquisition device had been turned off for more than a predetermined time period before the acquisition device being turned on; and
if the acquisition device had been turned off for more than the predetermined time period before the acquisition device being turned on, automatically generating an alert of whether to associate a previous memorandum with a next digital content item to be acquired, wherein the previous memorandum is associated with a last digital content item acquired in the acquisition device before the acquisition device was turned off.

27. The method of claim 26, wherein automatically associating the recorded first memorandum with one or more of the captured digital content items continues until the second memorandum is recorded.

28. The method of claim 26, wherein at least one of the first and second memoranda relates to an expected content of at least one digital content item to be acquired after the memorandum is recorded.

29. The method of claim 26, wherein at least one of the first and second memoranda relates to an expected location of acquisition of at least one digital content item after the memorandum is recorded.

30. The method of claim 26, wherein at least one of the first and second memoranda relates to an expected circumstance under which at least one digital content item is to be acquired after the memorandum is recorded.

31. The method of claim 26, wherein at least one of the first and second memoranda relates to an event at which at least one digital content item is to be acquired after the memorandum is recorded.

32. The method of claim 26, wherein at least one of the first and second memoranda relates to at least one person who is expected to participate in at least one of the digital content item to be acquired after the memorandum is recorded.

33. The method of claim 26, additionally comprising processing the stored data of the plurality of acquired digital content items along with the associated first and second memoranda in a utilization device different from the acquisition device by automatically creating first and second folders into which those of the acquired digital content items associated with respective first and second memoranda are automatically placed.

34. The method of claim 33, wherein the utilization system converts the first and second memoranda into text and creates labels for the first and second folders from the text.

35. The method of claim 33, wherein digital content items in one of the first or second folders are retrieved from the utilization device by the user repeating either of the first or second memoranda into a microphone connected with the utilization device.

36. The method of claim 26, additionally comprising:
sending the first and second audio memoranda to a processing device external of the acquisition device,
converting the form of the first and second audio memoranda into data of respective first and second character strings, and
storing the data of the plurality of digital content items along with the associated first and second character strings as the respective first and second memoranda and recording the associated character strings into headers of the digital content items.

37. The method of claim 36, wherein the first and second audio memoranda are sent over the Internet to the processing device, and the first and second character strings are sent back to the acquisition device from the processing device over the Internet.

38. The method of claim 36, wherein the first and second audio memoranda are sent by connection of a utilization device different from the acquisition device through a network to the processing device, and the first and second character strings are sent back to the utilization device from the processing device through the network.

39. The method of any one of claims 26-38, wherein the acquisition device includes a hand held digital picture acquisition device and the digital content items acquired thereby include digital data of pictures.

40. The method of any one of claims 26-38, wherein the acquisition device includes an audio acquisition device and the digital content items acquired thereby include digital data of sound items.

41. A hand held digital data acquisition device, comprising:
an interface that acquires individual items of digital data,
a microphone that generates data of audio annotations spoken from outside of the acquisition device, and
a processor that automatically and without user intervention links a first and one or more subsequently acquired ones of the individual items of acquired digital data to data of the most recent annotation spoken into the microphone prior to acquiring the individual items of digital data and records linking references of the annotation into headers of items of digital data;
wherein, when the acquisition device is turned on, the processor further determines whether the acquisition device had been turned off for more than a predetermined time period before the acquisition device being turned on; and
wherein if the acquisition device had been turned off for more than the predetermined time period before the acquisition device being turned on, the processor further automatically generates an alert of whether to link a next individual of digital data to be acquired to data of a previous audio annotation, wherein the data of the previous audio annotation is linked with a last individual of digital data acquired in the acquisition device before the acquisition device was turned off.

42. The acquisition device of claim 41, additionally comprising a memory in which the data of the individual items of digital data and linked data of one of the annotations are stored.

43. The acquisition device of any one of claims 41-42, wherein the items of digital data include pictures and the interface includes:
a photosensor that generates data of optical radiation images directed onto the photosensor, and
an optical system positioned to direct the images onto the photosensor from optical radiation outside the acquisition device.

44. The acquisition device of any one of claims 41-42, wherein the items of digital data include audio segments and the interface includes an audio transducer.

* * * * *